United States Patent [19]

Bellettato

[11] Patent Number: 5,453,228
[45] Date of Patent: Sep. 26, 1995

[54] METHOD AND SYSTEM FOR PREPARING PLASTIC MATERIAL LOADS FOR SUPPLY TO A MOLDING PRESS

[75] Inventor: Bruno Bellettato, Cirie', Italy

[73] Assignee: Iveco Fiat S.P.A., Italy

[21] Appl. No.: 122,336

[22] Filed: Sep. 17, 1993

[30] Foreign Application Priority Data

Sep. 18, 1992 [IT] Italy .................. TO92A0774

[51] Int. Cl.⁶ ............. B29C 31/08; B29C 31/10; B28B 11/16
[52] U.S. Cl. ............. 264/40.4; 264/40.7; 264/145; 425/126.1; 425/140; 425/142; 425/148; 425/297; 425/397; 425/403.1
[58] Field of Search .............. 264/40.4, 40.1, 264/40.7, 148, 160, 145; 425/140, 142, 148, 296, 297, 308, 397, 403.1, 121, 123, 126.1

[56] References Cited

U.S. PATENT DOCUMENTS

| | | | |
|---|---|---|---|
| 3,988,407 | 10/1976 | Gambill et al. | 264/40.7 |
| 4,038,531 | 7/1977 | Loe, Jr. | 425/140 |
| 4,088,721 | 5/1978 | Apicella, Jr. | 264/151 |
| 4,097,566 | 7/1978 | Bertin et al. | 264/40.7 |
| 4,156,913 | 5/1979 | Apicella, Jr. | 264/40.7 |
| 4,233,255 | 11/1980 | Moon | 264/40.7 |
| 4,436,685 | 3/1984 | Emura | 264/160 |
| 4,844,846 | 7/1989 | Peterson, Jr. et al. | 264/40.7 |
| 5,045,250 | 9/1991 | Brussel | 264/40.4 |

FOREIGN PATENT DOCUMENTS

| | | |
|---|---|---|
| 0368028 | 5/1990 | European Pat. Off. |
| 0394845 | 10/1990 | European Pat. Off. |
| 0461365 | 12/1991 | European Pat. Off. |
| 2575735 | 11/1986 | France . |
| 1135430 | 12/1968 | United Kingdom . |

*Primary Examiner*—Jay H. Woo
*Assistant Examiner*—Duane S. Smith
*Attorney, Agent, or Firm*—Myers, Liniak & Berenato

[57] ABSTRACT

A load of plastic material is formed from two sheets cut successively from a roll of strip material. The first sheet is cut to a roughly constant length, weighed and loaded on to a conveyor. The second sheet is cut to the length calculated according to the weight of the first sheet and is loaded on to the conveyor in a predetermined position in relation to the first sheet. Each sheet is positioned by transferring it from the cutting station to a transfer structure moved in relation to a stop structure set each time to a given programmed position.

11 Claims, 5 Drawing Sheets

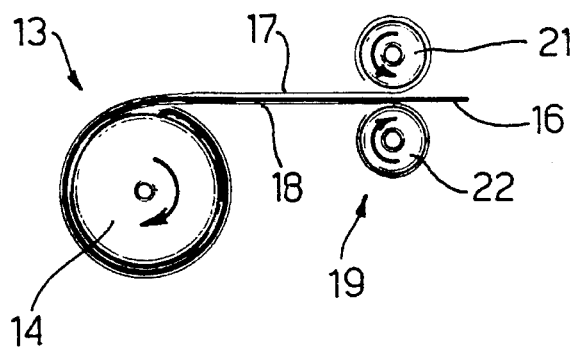
Fig. 2
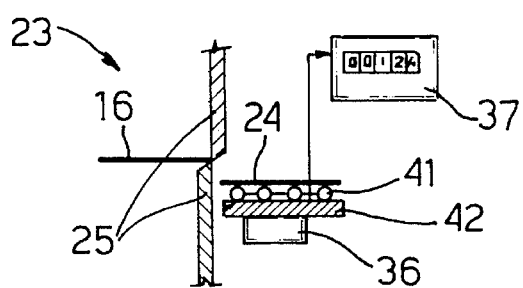
Fig. 3
Fig. 6
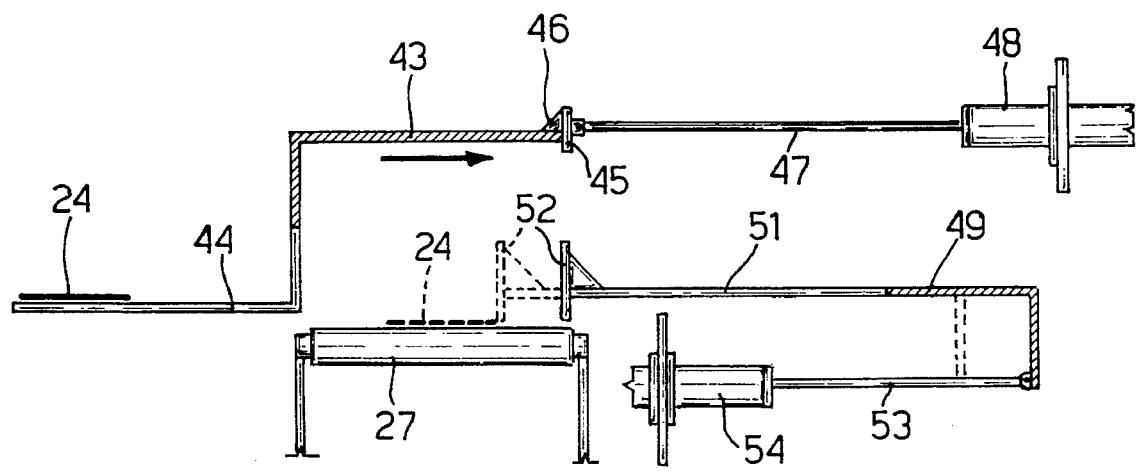

METHOD AND SYSTEM FOR PREPARING PLASTIC MATERIAL LOADS FOR SUPPLY TO A MOLDING PRESS

BACKGROUND OF THE INVENTION

The present invention relates to a method and system for preparing plastic material loads for supply to a molding press.

A common practice nowadays in the vehicle body component industry is to mold parts from plastic sheet material, such as heat-setting fiberglass-reinforced polyester resin known as sheet molding compound (hereinafter referred to as "SMC"), which is usually supplied in rolls. For each production part, the press is loaded with a number of sheets cut off the roll, and the size of which must correspond accurately to the part being produced. For each production part, known systems provide for cutting off two sheets, the second of which varies in size so that the total size of the two sheets approximately equals that required for the part being produced. A major drawback of such systems is the poor or inconsistent quality of the parts produced, due to inevitable errors in cutting and positioning the sheets. Moreover, a good deal of time and effort is expended for calculating and measuring the size of the second sheet, and positioning it accurately in relation to the first sheet.

SUMMARY OF THE INVENTION

It is an object of the present invention to provide a highly efficient method and system for preparing plastic material loads for supply to a molding press, designed to overcome the aforementioned drawbacks.

According to the present invention, there is provided a method of preparing plastic material loads for supply to a molding press, said material, in the form of a strip, being wound off a roll and cut into sheets, and said method being characterised by the fact that it comprises the following stages:

a cutting stage, wherein a first sheet of approximately constant length is cut off said roll;

a weighing stage, wherein said first sheet is weighed;

a positioning stage, wherein said first sheet is positioned on a conveyor supplying said press;

a cutting stage, wherein a second sheet is cut off said roll, and the length of which is defined according to the weight determined in said weighing stage; and a positioning stage, wherein said second sheet is positioned on said conveyor in a predetermined position in relation to said first sheet.

According to the present invention, there is also provided a system for preparing plastic material loads for supply to a molding press, said system comprising a conveyor for transporting said material in sheets to said press; and a cutting device for cutting said sheets off said strip; characterised by the fact that provision is made for a weighing device for weighing a first said sheet; and control and computing means for controlling said cutting device in such a manner as to cut a second said sheet, the length of which is defined according to the weight of said first sheet determined by said weighing device.

BRIEF DESCRIPTION OF THE DRAWINGS

A preferred, non-limiting embodiment of the present invention will be described by way of example with reference to the accompanying drawings, in which:

FIG. 2 shows a larger-scale part section along line II—II in FIG. 1;

FIG. 3 shows a schematic part section along line III—III in FIG. 1;

FIG. 6 shows a schematic section along line VI—VI in FIG. 4;

DETAILED DESCRIPTION OF THE INVENTION

Figure 1:
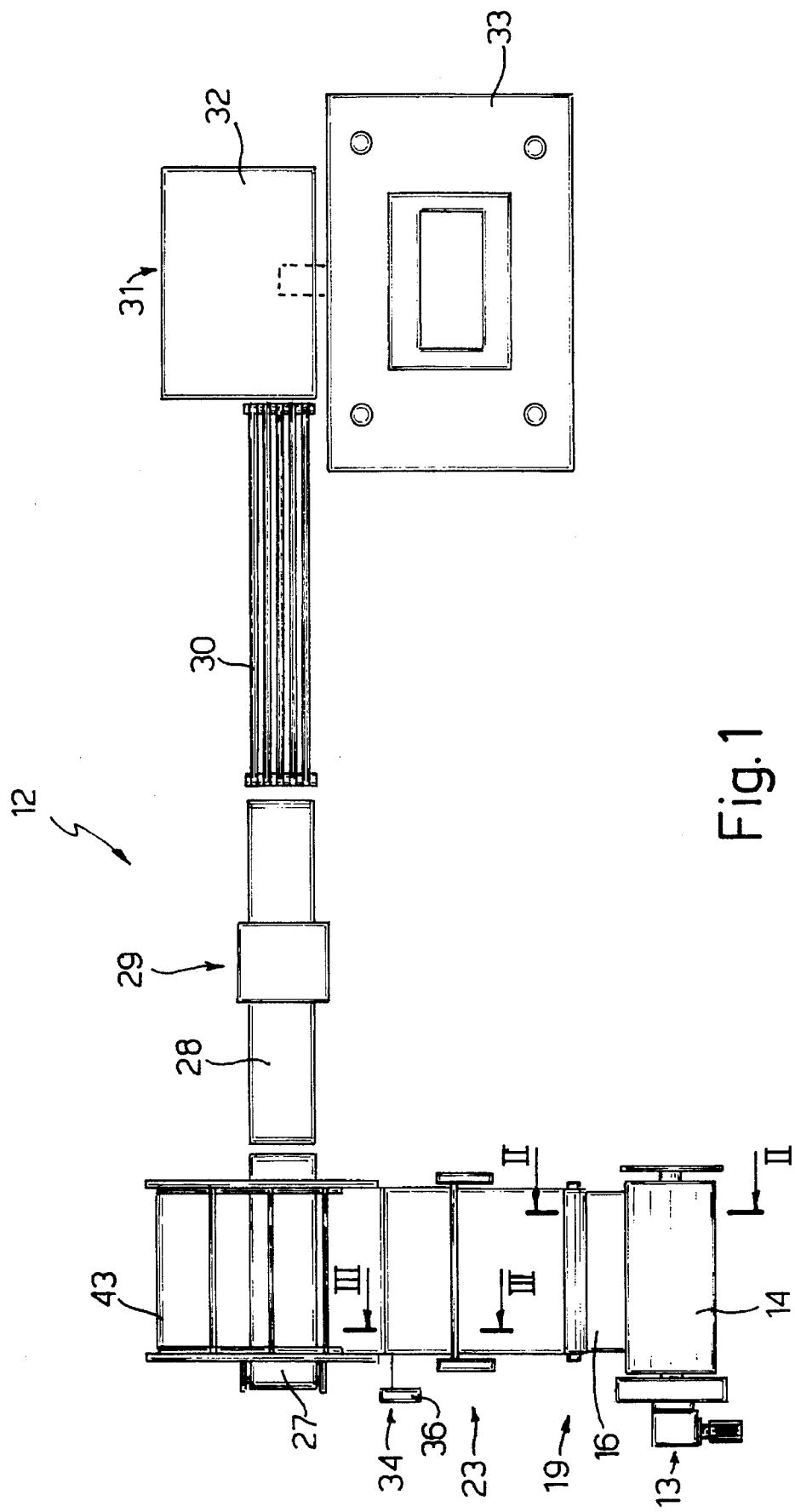
FIG. 1 shows a schematic plan view of a molding system comprising a system in accordance with the present invention.

Number 12 in FIG. 1 indicates an automatic vehicle body component manufacturing system comprising a loading station 13 equipped with a roll 14 of plastic strip material 16 (FIG. 2), e.g. fiberglass-reinforced polyester resin known as SMC. Strip 16 of SMC is supplied in two protective polyester films 17 and 18, which must be removed before use. For this purpose, system 12 also comprises a station 19 substantially consisting of two counter-rotating rollers 21 and 22 for respectively removing films 17 and 18 system 12 also comprises a cutting station 23 (FIG. 3) where strip 16 is cut into sheets 24 and 24' (FIG. 9) by a cutting device consisting substantially of two blades 25 controlled in known manner by a control unit 26 (FIG. 10) described in detail later on. The FIG. 10 blocks controlled by unit 26 represent the control circuits of the mechanical devices in FIGS. 1–6 and are indicated using the same numbering system.

System 12 also comprises a first conveyor belt 27 (FIGS. 1 and 6–9) for receiving sheets 24, 24' required for a given production part. Controlled by unit 26, conveyor 27 feeds sheets 24, 24' on to a second conveyor belt 28 (FIG. 1) by which they are fed through a preheat station 29 with an oven for heating sheets 24, 24' to a given temperature.

A third conveyor 30, e.g. consisting of a number of belts, feeds sheets 24, 24' from station 29 to a loading station 31 featuring a loading device 32 controlled by unit 26 for loading sheets 24, 24' into the mold of a molding press 33.

According to the present invention, system 12 comprises a weighing station 34 located between cutting station 23 and conveyor 27, and featuring a device 36 for weighing sheet 24, 24'. Weighing device 36 presents a display 37 (FIG. 3), and is enabled by control unit 26 (FIG. 10) for transmitting each weight to a computing unit 38 for storage in a memory 39. Computing unit 38 is also controlled by a routine stored, for example, in a ROM memory 40.

As it is weighed, sheet 24, 24' is supported on a number of rollers 41 (FIG. 3) on a supporting structure 42 of weighing device 36. Rollers 41 are rotated in known manner by control unit 26 so as to feed sheet 24, 24' on to transfer means comprising a first structure 43 (FIGS. 4–6) movable perpendicularly to the axis of rollers 41 between two fixed positions.

Figure 10:
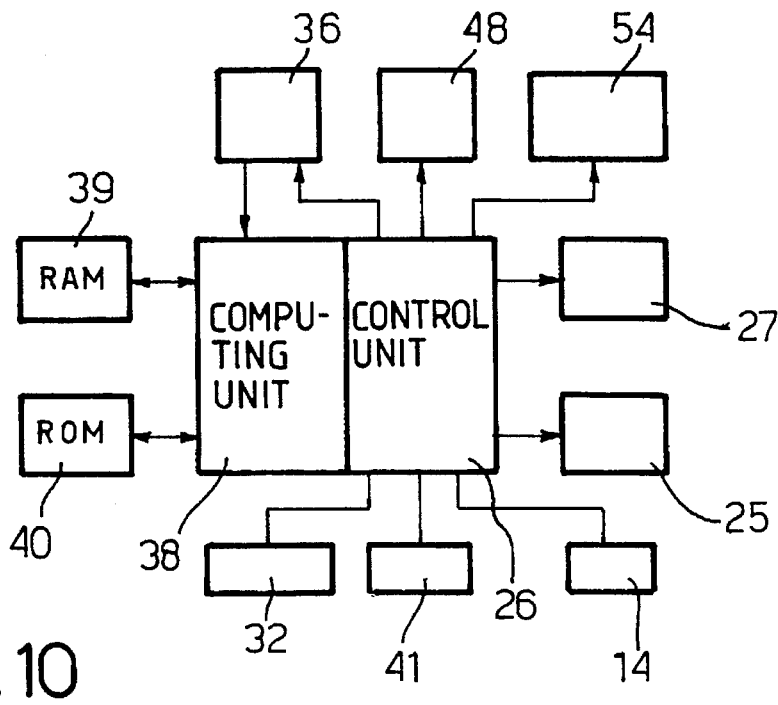
FIG. 10 shows a block diagram of a control device for governing the system according to the present invention.

Structure 43 presents a number of L-shaped bar elements 44 spaced parallel to the axis of rollers 41, and the horizontal arm of which is slightly below rollers 41. Structure 43 also presents a cross member 45 fitted with two braces 46, and two rods 47, each activated by a respective pneumatic linear actuator 48 controlled by unit 26 (FIG. 10).

Figure 11:
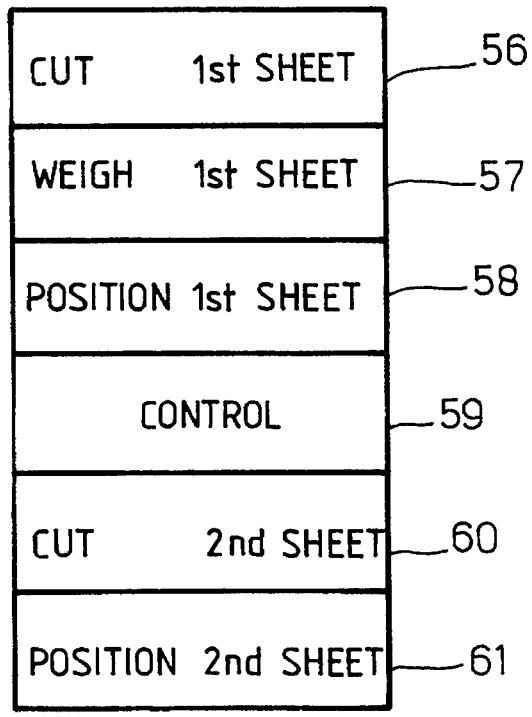
FIG. 11 shows a table of the various operating stages of the system according to the present invention.

Structure 43 cooperates with stop means comprising a second structure 49 (FIGS. 4–6) having a number of horizontal bars 51 alternating with bars 44. Each bar 51 terminates in a stop element consisting of a vertical square 52 for arresting the edge of sheet 24, 24'. Structure 49 is connected to two rods 53 of two pneumatic linear actuators 54 for moving structure 49, perpendicularly to the axis of rollers 41, into positions programmable in memory 40 of computing unit 38 according to the required position of sheets 24, 24'. Operation of the system according to the present invention will be described with the aid of the FIG. 11 table.

Firstly, control unit 26 rotates roll 14 (FIG. 2) so as to unwind strip 16 preparatory to cutting off a first sheet 24, the length of which is programmed according to the part being produced, and which may, if necessary, be constant for a series of different parts. Normally, structure 49 is so positioned as to arrest first sheet 24 in the position required on conveyor 27, as shown by the dotted line in FIG. 6.

Control unit 26 then enables blades 25 (FIG. 3) for performing a first operation or stage 56 (FIG. 11) wherein first sheet 24 is cut off strip 16. The length of sheet 24 is usually only roughly equal to the programmed length, and, when cut, sheet 24 rests entirely on rollers 41 of structure 42. Control unit 26 then enables weighing device 36 for performing weighing stage 57, wherein first sheet 24 is weighed and the result shown on display 37.

Figure 4:
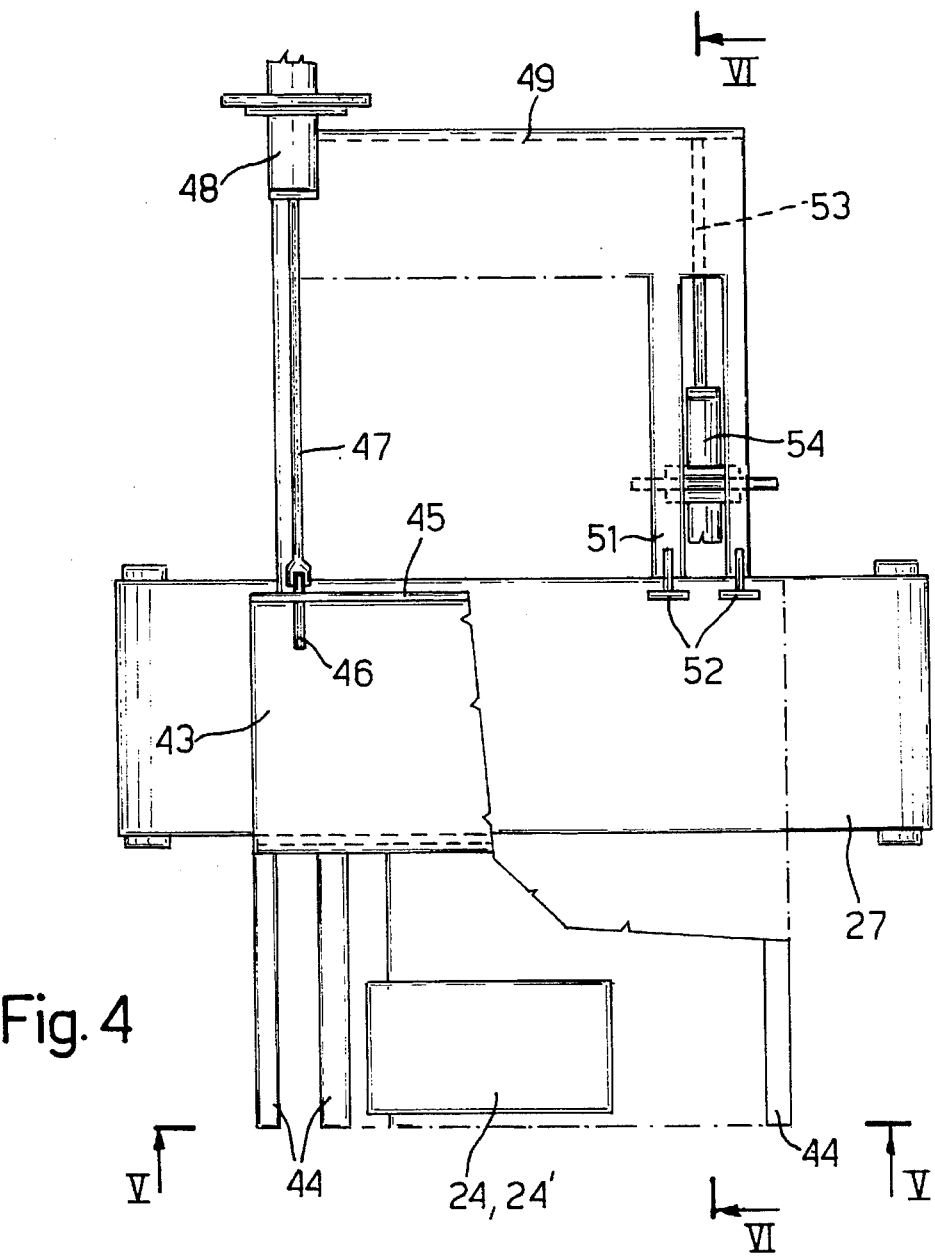
FIG. 4 shows a larger-scale plan view of a detail of the system according to the present invention.
Figure 5:
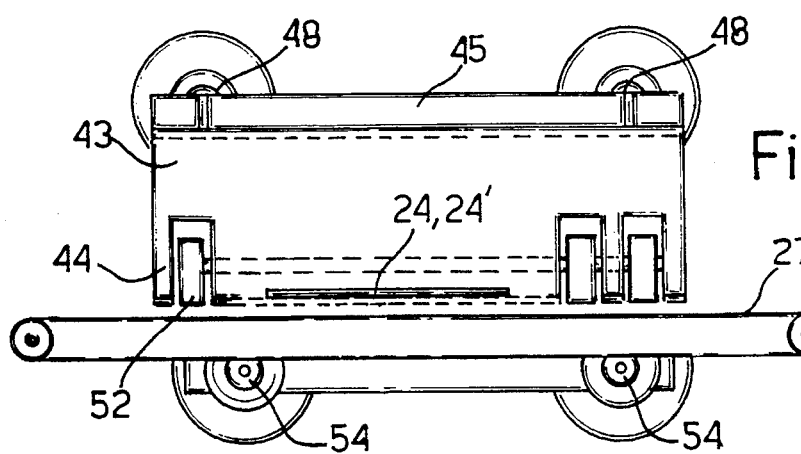
FIG. 5 shows a front view along line V—V in FIG. 4.

Control unit 26 then enables stage 58 for loading sheet 24 in a predetermined position on conveyor 27 (FIGS. 4–6). To do this, control unit 26 activates rollers 41 to transfer sheet 24 on to bars 44 of transfer structure 43, and then enables actuators 48 to move structure 43 rightwards in FIG. 6. When positioned as required on conveyor 27, the edge of sheet 24 is arrested by squares 52, and, as structure 43 withdraws, sheet 24 is transferred in this position from bars 44 on to conveyor 27.

At the same time, computing unit 38 performs control stage 59, which consists in storing the weight of sheet 24 in memory 39, and computing the length of strip 16 required for second sheet 24' to make up the total weight programmed for the production part. Computing unit 38 also governs control unit 26 so as to reel off strip 16 preparatory to cutting off second sheet 24' to the computed length. At this point, blades 25 are again enabled for performing a further cutting stage 60 wherein second sheet 24' is cut off strip 16.

Figure 7:
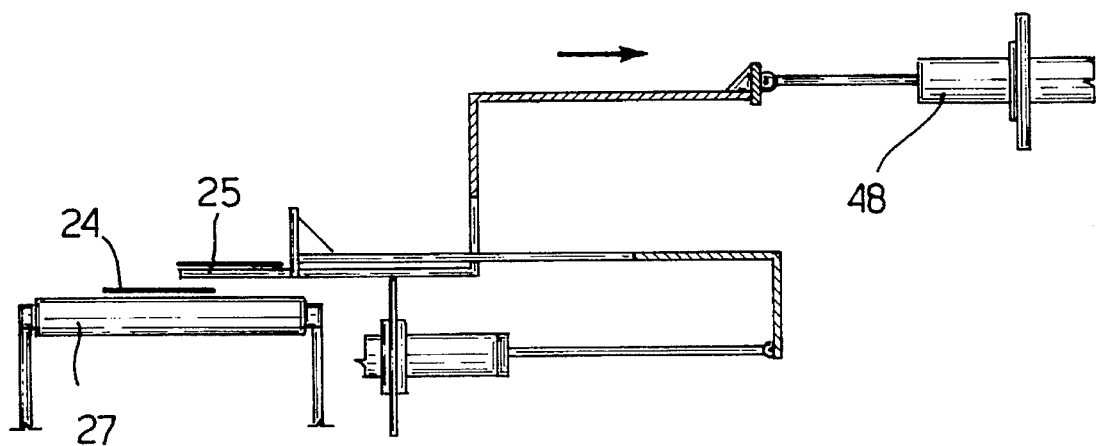
FIGS. 7 and 8 show the FIG. 6 section in two different operating positions.
Figure 8:
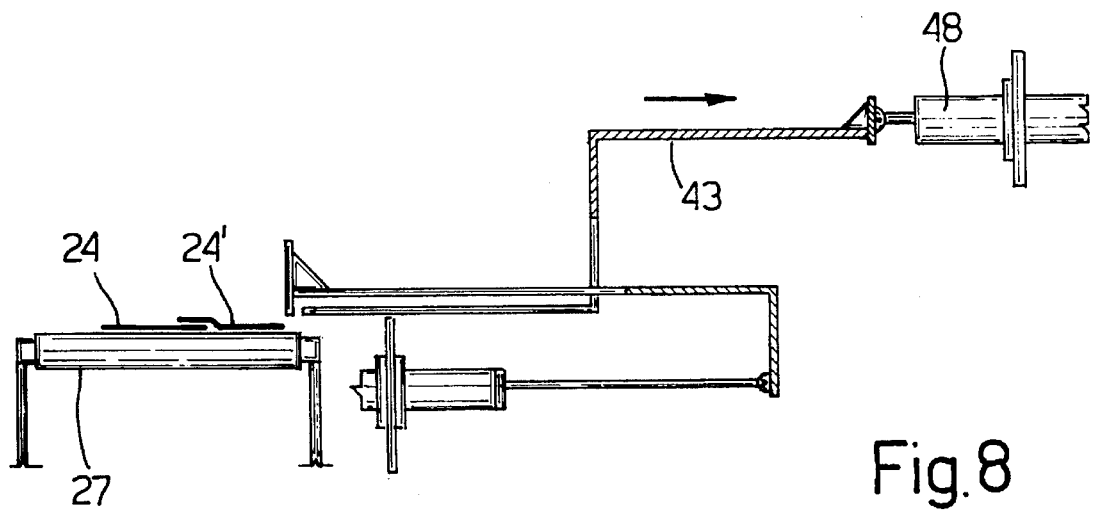
Figure 9:
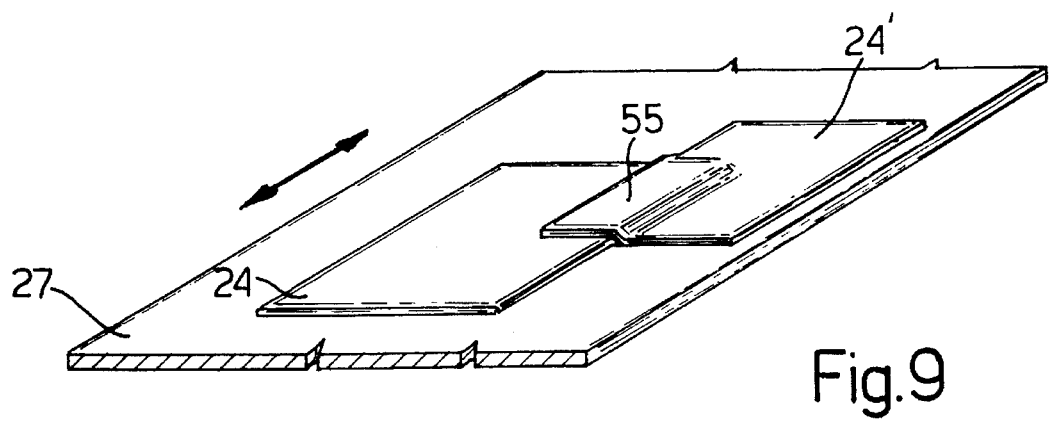
FIG. 9 shows a part view in perspective of the relative position of two sheets constituting the load.

Finally, stage 61 is enabled for positioning second sheet 24'. To do this, control unit 26 first enables actuators 54 to move structure 49 rightwards into the position shown by the continuous line in FIG. 6, which position corresponds with the required position of second sheet 24' on conveyor 27, perpendicular to the axis of rollers 41. At the same time, control unit 26 activates conveyor 27 to so position first sheet 24 as to receive second sheet 24' in the required mutual position parallel to the axis of rollers 41. Control unit 26 then activates rollers 41 to transfer second sheet 24' on to bars 44 of structure 43, and enables actuators 48 to arrest second sheet 24' against squares 52, as shown in FIG. 7. As structure 43 withdraws, second sheet 24' is transferred on to conveyor 27 as shown in FIG. 8, with sheets 24 and 24' overlapping by a given portion 55, as shown in FIG. 9. Finally, conveyor 27 is activated to feed sheets 24 and 24' on to second conveyor 28, while actuators 48 and 54 move structures 43 and 49 back to the start position. The advantages of the method and system according to the present invention will be clear from the foregoing description. In particular, automatic, accurate sizing of second sheet 24' provides for eliminating rejects due to material shortage, and, conversely, wastage and removal of excess material in the event of overloading. Moreover, accurate mutual positioning of sheets 24 and 24' with overlapping portion 55 ensures the production of good, consistent quality parts.

To those skilled in the art it will be clear that changes may be made to the method and system as described and illustrated herein without, however, departing from the scope of the present invention. For example, changes may be made to the location of the various stations and the design of individual devices.

I claim:

1. In a method of preparing at least two moldable sheets of material for insertion into a molding press, wherein said material is initially in the form of a strip wound on a roll and is thereafter unwound from the roll, cut into preselected lengths and at least two such sheets are located in a desired position one with respect to the other on a conveyor means which thereafter inserts said at least two such positioned sheets into the molding press, the improvement comprising:

effecting a first unwinding of said roll in an amount sufficient thereby to present to a cutting means a first preselected length of said moldable material;

cutting said moldable material to said first preselected length thereby to create a first moldable sheet of said material;

weighing said first sheet;

positioning said first sheet in a preselected position on said conveyor means;

calculating from said weight of said first sheet a preselected length of said second sheet;

effecting a second unwinding of said roll in response to said calculation of said preselected length of said second sheet, said second unwinding being in an amount sufficient to present to said cutting means a length of said material equal to said calculated preselected length of said second sheet;

cutting said so presented length of said material thereby to create a second moldable sheet of said material;

positioning said second sheet in a preselected position on said conveyor means such that said first and second sheets are located in said desired position one with respect to the other on said conveyor means; and thereafter inserting said sheets so positioned into said mold press.

2. A method according to claim 1 which further comprises: recording in a memory means the weight of said first sheet and computing from said weight so recorded in said memory means said preselected length of said second sheet.

3. A method according to claim 2 wherein the said positioning of one sheet with respect to the other includes setting a stop means for each sheet and transferring each said sheet to said stop means.

4. A method according to claim 1 wherein said positioning of said second sheet with respect to said first sheet includes moving said first sheet parallel to the cut line made during said cutting of said sheets.

5. In an apparatus for preparing at least two moldable sheets of material located in a desired position one with respect to the other for insertion into a molding press, wherein said material is initially in the form of a strip wound on a roll and is thereafter unwound from the roll into preselected lengths, the apparatus including cutting means for cutting the sheets into preselected lengths and conveyor means for inserting said cut sheets into a molding press, the improvement comprising:

means for effecting a first unwinding of said roll in an amount sufficient thereby to present to said cutting means a first preselected length of said moldable material;

means for weighing said first cut sheet of said first preselected length;

means for recording said weight of said first cut sheet and for calculating from said recorded weight a second preselected length for a said second sheet;

means for locating said first cut sheet in a first preselected position on said conveyor means;

means for effecting a second unwinding of said roll in response to said calculation of said length of said second sheet in an amount sufficient to present to said cutting means a length of said material equal to said calculated preselected length of said second sheet; and means for locating said second cut sheet in a second preselected position on said conveyor means such that said first and second sheets are located in said desired position one with respect to the other on said conveyor means.

6. An apparatus according to claim 5 wherein said means for recording said weight of said first cut sheet and for calculating from said recorded weight a second preselected length of said second sheet includes memory means for storing said weight and programmable means for computing the said length of said second sheet on the basis of said stored weight, and wherein said means for effecting said unwinding of said roll and for cutting of said sheets includes control means responsive to said computation of said length of said second sheet.

7. An apparatus according to claim 6 wherein said apparatus further includes means for moving the sheets after they are cut and said control means further coordinates the cutting of said sheets and the means for moving said sheets.

8. An apparatus according to claim 5 which further includes transfer means for receiving each said sheet when cut and for transferring each said sheet to said conveyor means and adjustable stop means for positioning said sheets on said conveyor means.

9. An apparatus according to claim 8 wherein said apparatus further includes a first linear actuator and said transfer means includes a first structure movable between two fixed positions by said first linear actuator.

10. An apparatus according to claim 9 wherein said apparatus further includes a second linear actuator and said adjustable stop means includes a second structure movable to a preselected stop position by said second linear actuator; said apparatus further including programming means for determining the location of any said preselected stop position.

11. An apparatus according to claim 10 wherein said programming means includes means for causing said second structure to be moved in a first direction to reach said preselected stop position for said first sheet and simultaneously for causing said conveyor to move said first sheet in a second direction for locating said second sheet in a predetermined overlapping relationship with said first sheet along both said directions.

* * * * *